(12) United States Patent
Hirashima et al.

(10) Patent No.: US 10,343,288 B2
(45) Date of Patent: Jul. 9, 2019

(54) MACHINING METHOD AND MACHINING SYSTEM

(71) Applicant: KAWASAKI JUKOGYO KABUSHIKI KAISHA, Kobe-Shi, Hyogo (JP)

(72) Inventors: Atsushi Hirashima, Nishinomiya (JP); Hideo Kawahara, Akashi (JP); Masamichi Yamaguchi, Sennangun (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 226 days.

(21) Appl. No.: 15/539,877

(22) PCT Filed: Dec. 25, 2015

(86) PCT No.: PCT/JP2015/086221
§ 371 (c)(1),
(2) Date: Jun. 26, 2017

(87) PCT Pub. No.: WO2016/104700
PCT Pub. Date: Jun. 30, 2016

(65) Prior Publication Data
US 2018/0001484 A1    Jan. 4, 2018

(30) Foreign Application Priority Data

Dec. 26, 2014  (JP) ................................. 2014-265698

(51) Int. Cl.
*G06F 19/00*     (2018.01)
*G06G 7/70*      (2006.01)
(Continued)

(52) U.S. Cl.
CPC .......... *B25J 13/085* (2013.01); *B23B 39/161* (2013.01); *B23B 39/166* (2013.01); *B23B 39/168* (2013.01); *B25J 5/02* (2013.01); *B25J 9/0084* (2013.01); *B25J 9/1633* (2013.01); *B25J 9/1697* (2013.01); *B25J 11/005* (2013.01); *B25J 15/0019* (2013.01); *B25J 15/0057* (2013.01); *B25J 15/0061* (2013.01); *B25J 15/0066* (2013.01); *B23B 2215/04* (2013.01)

(58) Field of Classification Search
None
See application file for complete search history.

(56) References Cited

FOREIGN PATENT DOCUMENTS

JP   S60-249519 A   12/1985
JP   H02-024014 A    1/1990
(Continued)

OTHER PUBLICATIONS

Jan. 26, 2016 International Search Report issued in International Patent Application No. PCT/JP2015/086221.

*Primary Examiner* — Bhavesh V Amin
(74) *Attorney, Agent, or Firm* — Oliff PLC

(57) ABSTRACT

A machining system having plural machining devices installed at plural points in a robot arm, the machining system carrying out machining to a processed object made of metal be by using these machining devices, the machining system further having a control device that controls drive of the machining devices so as to offset processing reaction forces by at least one of a thrust force and a torque to be obtained when the machining devices carry out machining to the processed object simultaneously between the machining devices.

13 Claims, 9 Drawing Sheets

(51) Int. Cl.
  *B25J 13/08* (2006.01)
  *B23B 39/16* (2006.01)
  *B25J 9/16* (2006.01)
  *B25J 15/00* (2006.01)
  *B25J 5/02* (2006.01)
  *B25J 9/00* (2006.01)
  *B25J 11/00* (2006.01)

(56) References Cited

FOREIGN PATENT DOCUMENTS

| | | |
|---|---|---|
| JP | H08-229715 A | 9/1996 |
| JP | 2008-207281 A | 9/2008 |
| JP | 2010-214507 A | 9/2010 |
| JP | 2012-202193 A | 10/2012 |

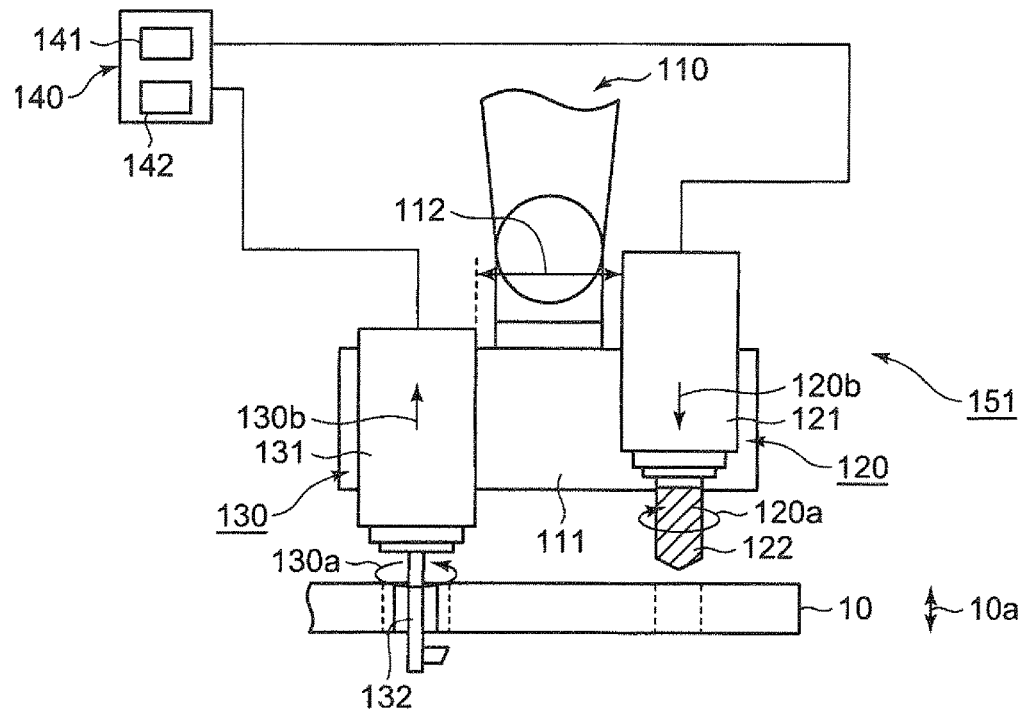
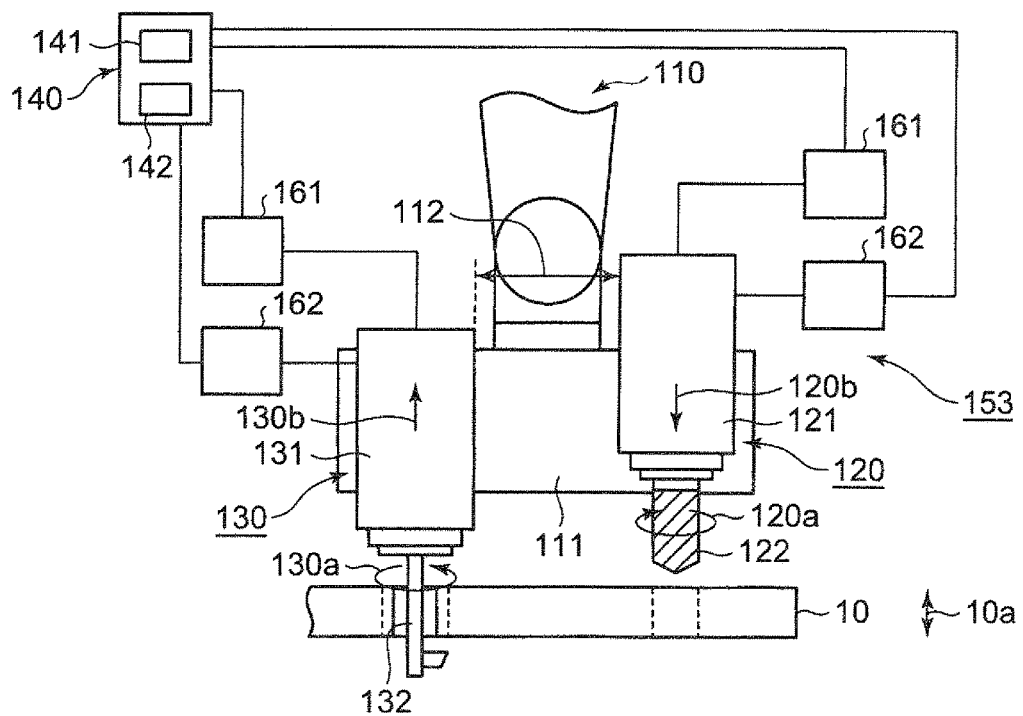

MACHINING METHOD AND MACHINING SYSTEM

TECHNICAL FIELD

The present invention relates to a machining method and a machining system, in particular relates to a machining method applicable when machining is performed to a processed object by using a robot, and a machining system.

BACKGROUND ART

In a case where machining such as cutting is performed to a small member such as a thin wall pipe, the machining is performed to the small member by using a cutting tool or the like in a machine tool with the small member held in the machine tool (for example, see Patent Document 1).

In a case where machining such as punching for rivets is performed to a large number of points in a large size member such as an airplane, operations are conventionally performed by man power with using a jig or the like. However, the operations performed by man power cause problems that working efficiency is poor, cost is high, and processing precision is reduced or processing itself becomes difficult at a place where a posture of an operator is unstable. In a case where an object to be processed is the large size member, when the machine tool described above is used, there is a problem that the machine tool itself for the machining is increased in size thereby increasing the equipment cost.

Meanwhile, in recent years, machining by using a robot is increasingly performed instead of by a human operator. In a case where the robot is used, an installment place is relatively small, workability is higher than the human operator, and only a few robots are required to be arranged even for the large size member. Thus, the cost is relatively easily lowered. Additionally, in the case where the robot is used, freedom of a working posture is higher than the case of the human operator. Thus, the processing precision can be stabilized.

PRIOR ART DOCUMENT

Patent Document

Patent Document 1: JP 2008-207281 A

SUMMARY OF THE INVENTION

Problems to be Solved by the Invention

However, the robot has smaller rigidity due to make use of a robot arm than that of the machine tool with a frame configuration. Thus, the case of robot, it is often difficult to carry out an operation such as cutting and punching in which a machining device is attached to a leading end part of the robot arm and a load is applied to the machining device. Therefore, in reality, the machining performed by the robot is limited to a processed object of a soft material such as a resin material to which a load for the machining can be applied with relatively small.

Thus, the load is large in performing the machining to a processed object made of metal with the robot, as a result, there is a problem that processing precision and processing quality are reduced. In general, in a case of performing the machining, for example punching, to a fixed metal processed object, when the punching is firstly started, that is, a tool edge is led to bite the object, and a hole is completely made through the object, a torque fluctuation is particularly increased. Further, during the punching, a thrust force is generated in the forward direction of a drill. Thus, at the time of such processing, in a case where rigidity in a processing equipment is insufficient, displacement of a processing position or the like is generated, and there is a problem that reduction in the processing precision and the processing quality is caused. In a case where the machining such as the punching is performed to the metal processed object by using the robot, a hole diameter with which satisfactory processing precision and quality are obtained is about $\phi 10$ mm at most on current condition. Meanwhile, in a case of, for example, an airplane, a hole of about $\phi 20$ mm is sometimes punctured.

In order to compensate low rigidity in the robot, a jig may sometimes be used. However, installation operation for the jig is required, and manufacture of a new jig is also required together with a change in a processing place. Thus, production efficiency is lowered and the cost is increased.

The present invention is achieved in order to solve such problematic points, and an object thereof is to provide a machining method and a machining system enabling machining for a processed object by using a processing mechanism.

Means for Solving the Problems

In order to achieve the object described above, the present invention is formed as follows.

That is, a machining method in a first aspect of the present invention is a machining method performing machining to a processed object made of metal by using various machining devices installed at plural points in a processing mechanism, comprising:

determining at least one of a thrust force and a torque for each of the machining devices, the thrust force and the torque being obtained when each machining device carries out the machining to the processed object; and controlling drive of the machining devices by a control device so as to offset processing reaction forces caused by at least one of the thrust force and the torque to be obtained when the machining devices carry out the machining to the processed object simultaneously.

A machining system in a second aspect of the present invention is a machining system having plural machining devices installed at plural points in a processing mechanism, the machining system carrying out machining to a processed object made of metal by using the machining devices, the machining system comprising:

a control device configured to control drive of the machining devices so as to offset processing reaction forces caused by at least one of a thrust force and a torque to be obtained when the machining devices carry out the machining to the processed object simultaneously between the machining devices.

According to the machining method and system described above, because of the control device, the drive of the machining devices is controlled so as to offset the processing reaction forces caused by at least one of the thrust force and the torque of the machining devices. Thus, even when the machining is performed to the metal processed object by using the processing mechanism, the processing reaction forces acting on the processing mechanism can be reduced more than the conventional example, and reduction in processing precision and processing quality can be prevented.

Effects of the Invention

According to the machining method in the first aspect of the present invention and the machining system in the second aspect, machining can be performed to the metal processed object by using the processing mechanism.

BRIEF DESCRIPTION OF THE DRAWINGS

FIG. 3A is a view showing details of a part A shown in FIG. 1.

FIG. 3B is a view showing a modified example of the machining devices shown in FIG. 1.

EMBODIMENTS OF THE INVENTION

A machining system serving as an embodiment and a machining method to be executed in the machining system will be described below with reference to the drawings. In the figures, the same or similar constituent parts will be given the same reference symbols. In order to avoid unnecessary redundancy of the following description and facilitate understanding of those skilled in the art, detailed description of the already well-known matters and duplicated description of the substantially same configurations will sometimes be omitted. Contents of the following description and the attached drawings do not intend to limit the subject matters described in the claims.

In the following embodiments, drilling and back-boring (boring) will be adopted as examples of machining. However, the matters disclosed in the embodiments are not limited to these but can be applied to other machining such as milling, end milling, and reaming. The following embodiments can also be applied to a case where any one of these machining is executed.

In the following embodiments, a processed object made of metal (a metal processed object) will be adopted as an example of an object to be processed to which the machining is performed. However, the above processed object is not limited to the metal object. That is, as already described, the processed object to which the machining is performed by using a robot is conventionally limited to a soft material such as a resin material to which a load for the machining can be applied with relatively small. In the following embodiments, a processing material having higher hardness than such a soft material, that is, a hard processing material corresponds to the processed object. The processed object may be, for example, a plate member, a cylindrical member, a columnar member, or the like, however the shape thereof is not particularly limited.

First Embodiment

A configuration of a machining system in a first embodiment will be described below firstly with reference to FIGS. 1, 3A, and 5.

Figure 1:
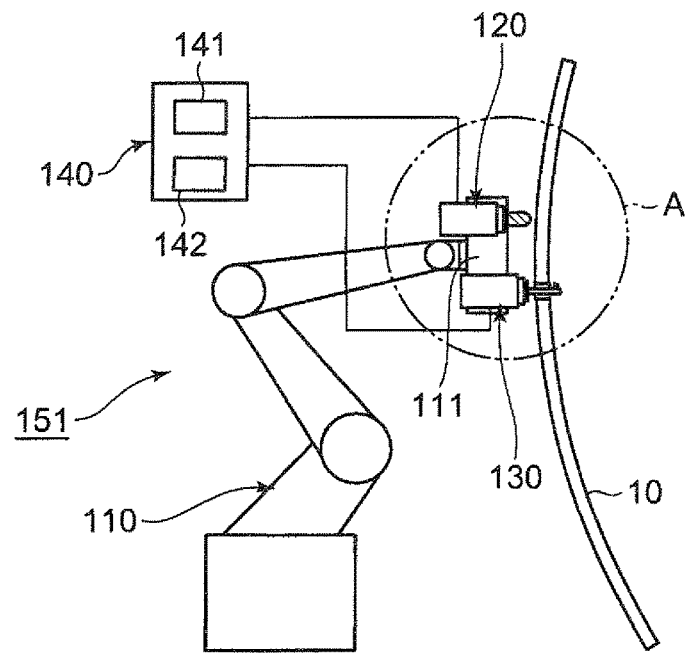
FIG. 1 is a view showing a schematic configuration of a machining system in a first embodiment.

FIG. 1 shows a schematic configuration of a machining system 151 serving as one example. This machining system 151 is an apparatus having a robot 110 corresponding to one example of a processing mechanism, a first machining device 120, a second machining device 130, and a control device 140 as basic constituent parts, and the system is capable of performing at least one of machining actions such as punching (sometimes referred as drilling), hole-enlarging in a case where a hole is already made (sometimes referred to as boring), or back-boring to a metal processed object 10 at plural points at the same time.

Hereinafter, the constituent parts described above in the machining system 151 will be successively described.

The robot 110 is a mechanism basically defined by an axial structure, and corresponds to a multi-axis processing mechanism such as an arm type mechanism in which a number of joints are arranged or a parallel link type mechanism in which link mechanisms are controlled in parallel. A robot formed by two or three slide shafts arranged at right angles, the so-called Cartesian coordinate robot is not included. Another example of the processing mechanism other than the robot includes, for example, a small-sized machine tool with weak rigidity, or a machine having an electric actuator formed by a linear guide.

In the present embodiment, as shown in FIG. 3A, the first machining device 120 and the second machining device 130 are installed in parallel in an arm part 111 on a leading end of the robot 110 on the same side with respect to the processed object 10. In such a way, the robot 110 has plural machining devices in the arm part 111. As shown in FIG. 1, the first machining device 120 and the second machining device 130 are respectively electrically connected to the control device 140, are controlled in their driving by the control device 140 as described later, and then carry out a plurality of the machining actions to the processed object 10 at the same time. Here, "at the same time" means that the machining actions with the first machining device 120 and the second machining device 130 are started at the same time, progress simultaneously, and are finished at the same time.

In the present embodiment, the first machining device 120 is a device that carries out punching, that is, drilling to the processed object 10, or in detail to a side surface (referred to as a longitudinal side surface) along a longitudinal direction of the processed object 10 at right angles, and as shown in FIG. 3A, has a drive portion 121 and a processing tool 122. The drive portion 121 carries out driving of both rotary motion of the processing tool 122 and linear motion in which the processing tool 122 goes forward and backward in the same direction as a thickness direction 10a of the processed object 10. As one example of the processing tool 122 to be driven by the drive portion 121, a drill is adopted in the present embodiment. As shown in FIG. 3A, the first machining device 120 having the above configuration moves the processing tool 122 (sometimes referred to as the drill 122) in a first direction 120b in which a hole is made along the same direction as the thickness direction 10a of the processed object 10 while rotating the drill 122 in, for example, a clockwise direction 120a with the drive portion 121.

In the present embodiment, the second machining device 130 is a device that carries out the back-boring with respect to the hole made in advance at right angles on the longitudinal side surface of the processed object 10, and as shown in FIG. 3A, has a drive portion 131 and a processing tool 132. The drive portion 131 carries out driving of both rotary motion of the processing tool 132 and linear motion in which the processing tool 132 goes forward and backward in the same direction as the thickness direction 10a of the processed object 10. As one example of the processing tool 132 to be driven by the drive portion 131, a back-boring tool is adopted in the present embodiment. As shown in FIG. 3A, the second machining device 130 having such the above configuration moves the processing tool 132 (sometimes referred to as the back-boring tool 132) in a second direction 130b which is opposite to the first direction 120b described above along the same direction as the thickness direction 10a while rotating the back-boring tool 132 in, for example, a counterclockwise direction 130a with the drive portion 131.

In the first machining device 120 and the second machining device 130, the processing tool 122 and the processing tool 132 are replaceable, and the size and the type thereof can be changed. Thereby, a change in the hole diameter and the like can be handled. This replacement may be done by an operator or may be done automatically by a tool replacement device 163 as described later with reference to FIG. 6.

Further, an arrangement pitch 112 between the first machining device 120 and the second machining device 130 can also be changed. Thereby, a change in the pitch between the processed holes can also be handled. This change in the arrangement pitch 112 may be done by, for example, providing plural installable points in advance in the arm part 111 and changing installment place thereof by the operator, or may be automatically done by a pitch change device 162 as described later with reference to FIG. 3B.

The control device 140 is a device that controls driving of the first machining device 120 and the second machining device 130. The control device 140 may carry out action control of the robot 110 together. The control device 140 will be described in detail below.

The control device 140 is a device that controls the driving of the first machining device 120 and the second machining device 130 so as to make the sum of absolute values the same or the substantially same, and offset processing reaction forces between the first machining device 120 and the second machining device 130, wherein the above absolute values correspond to values from the machining devices in at least one of, or both of (in the present embodiment), a thrust force and a torque serving as a cutting load when the first machining device 120 and the second machining device 130 simultaneously carry out the machining to the processed object 10, and the processing reaction forces are caused by at least one of, or both of (in the present embodiment), the thrust force and the torque.

In the present embodiment, with respect to the processed object 10, as described above the control device 140 controls to rotate the drill 122 in the clockwise direction 120a and move the drill in the first direction 120b with respect to the first machining device 120, and controls to rotate the back-boring tool 132 in the counterclockwise direction 130a and move the back-boring tool in the second direction 130b which is opposite to the first direction 120b with respect to the second machining device 130. By performing such controlling actions, the reaction forces acting on the robot arm of the robot 110 with the machining actions of the first machining device 120 and the second machining device 130 can be counterbalanced with each other.

The control device 140 with the above configuration functionally has, for example, a condition setting unit 141 and a storage unit 142 as shown in FIG. 1. The storage unit 142 stores values of the thrust force and the torque set in accordance with the type of machining such as the drilling and back-boring. The thrust force and the torque are determined from at least one of calculation formulas to be described later and a detection test to be performed in accordance with the type of machining. The condition setting unit 141 sets a drive condition for the first machining device 120 and the second machining device 130 such that the processing reaction forces can be offset in accordance with the stored thrust force and the stored torque and/or a case where the thrust force and the torque are determined by using the calculation formulas.

The control device 140 is put into practice by using a computer, and the condition setting unit 141 is configured with software corresponding to the functions described above and hardware such as a CPU (central processing unit) for executing the functions.

Setting of the drive condition for the machining devices 120, 130 to be executed in the control device 140 will be described in detail below.

Firstly, the thrust force and the torque required for setting the drive condition will be described.

Regarding the reaction force in the drilling carried out in the first machining device 120, the thrust force and the torque mainly act as the reaction force in the drilling. Although a force is also generated in a radial direction (X, Y direction) of the drill, since the force is extremely small in comparison to the thrust force and the torque, which is ignorable.

Regarding the reaction force in the back-boring and the boring carried out in the second machining device 130, as well as the drilling, the thrust force and the torque mainly act as the reaction force. Therefore, the cutting load to be taken into consideration in the machining in the first machining device 120 and the second machining device 130 is the thrust force and the torque.

Here, in the back-boring and the boring, even when a feed distance per one rotation of the processing tool 132 and a cutting volume per unit time are the same as those of the drilling, the thrust force is lower than a case of the drilling. This is because a center part of the processing tool 122 generates the thrust force the most in the drilling whereas the thrust force is low at an outer peripheral part in the back-boring tool 132 and the like.

Next, a relationship between a cutting condition of the drilling and the processing reaction force in the first machining device 120 will be described.

As an empirical rule of the drilling, there are the following calculation formulas as one example. However, in practice, since a change would be made according to the shape of the drill (the thinning and the tip angle), deflection of the rotation axis, the state of the processing material (material, hardness, and the like), or the like, the calculation formulas should be regarded as just rough standards. There are also various calculation formulas according to literatures.

Calculation formulas of M. C. Show & C. J. Oxford $$F=0.711 \cdot H_B \cdot f^{0.8} \cdot d^{0.8}+0.0022 \cdot H_B \cdot d^2$$

F: thrust force (N)
$H_B$: Brinell hardness (N/mm$^2$)
f: feed (mm/rev)
d: tool diameter (mm)

$$T=0.317 \cdot H_B \cdot f^{0.8} \cdot d^{1.8}$$

T: cutting torque (N·mm)
$H_B$: Brinell hardness (N/mm$^2$)
f: feed (mm/rev)
d: tool diameter (mm)

A relationship between a cutting condition of the back-boring (boring) and the processing reaction force in the second machining device 130 will be described.

The boring and back-boring are the same cutting mode as the turning of inner diameter in the turning when relatively seen. Thus, it is considered that the following calculation formulas are held as one example. A rating cut-resistance "Ks" (MPa) is a constant to be changed with the processing material and the feed "f" per rotation (mm/rev), and its estimate value is written in a literature. However, its exact value is preferably obtained by actually measuring a reaction force with a cutting test. A cutting resistance "F" (N) is a resultant force of a main component force "Ft" (N), a radial component force "Fn" (N), and a feed component force "Ff" (N). The thrust force corresponds to the feed component force "Ff" of the turning. A ratio of the main component force "Ft" (N), the radial component force "Fn" (N), and the feed component force "Ff" (N) is changed with the tool, the shape of the blade edge, or the like. Thus, preliminary measurement by the cutting test is preferable.

$$F=\sqrt{F_t^2+F_n^2+F_f^2}\; F=K_s \cdot f \cdot t$$

F: cutting resistance (N)
$F_t$: main component force (N)
$F_n$: radial component force (N)
$F_f$: feed component force (thrust force) (N)
$K_s$: rating cut-resistance (MPa)
f: feed (mm/rev)
t: cutting depth (mm)

$$F = \sqrt{F_t^2 + F_n^2 + F_f^2} \quad T = F_t \cdot \frac{d}{2}$$

T: cutting torque (N·mm)
F: cutting resistance (N)
$F_t$: main component force (N)
$F_n$: radial component force (N)
$F_f$: feed component force (thrust force) (N)
d: tool diameter (mm)

On the premise of the contents described above, a method of offsetting the processing reaction forces will be described.

The control device 140 sets such a condition that the sum of the absolute values of at least one of, or both of (in the present embodiment), the thrust force and the torque in the first machining device 120 and the second machining device 130 is made the same or the substantially same with reference to the calculation formulas described above, and cancels out the processing reaction forces by driving the first machining device 120 and the second machining device 130 under the set condition. As described above, the calculation formulas described above are to determine values of rough standards. Thus, for confirmation or for further improvement of precision, measured values obtained by performing a detection test through actually implemented machining may be used. These calculation formulas and measured values can be stored in the storage unit 142 of the control device 140.

The method of counterbalancing the processing reaction forces will be described in detail. As in the calculation formulas described above, factors influencing the thrust force are feed "f" per rotation (mm/rev) and a cutting allowance (the tool diameter "d" (mm) for the drill, and cutting depth "t" (mm) for boring and back-boring) of the tool.

Therefore, in order to make the thrust force the same and to make the processing time the same, each of the feeds (mm/min) along main axes in both the first machining device 120 and the second machining device 130 is made the same, and the following procedures are implemented. Among these procedures, an action of "Method A" is functionally executed in the condition setting unit 141 in the control device 140.

1. In a case where the thrust force is different

Method A

The rotation number (rpm) of the first machining device 120 or the second machining device 130 which has a higher thrust force is increased, and in the state that each of the feeds (mm/min) along main axes in both the first machining device 120 and the second machining device 130 is made the same, the feed "f" per rotation (mm/rev; feed distance) is lowered.

Alternatively, the rotation number (rpm) of the machining device which has a lower thrust force is reduced, and in the state that each of the feeds (mm/min) along the main axes is made the same, feed "f" per rotation (mm/rev; feed distance) is increased.

Method B

The cutting allowance (mm) of the first machining device 120 or the second machining device 130 which has a higher thrust force is reduced, and the cutting allowance (mm) of the machining devices which has a lower thrust force is increased.

Method C

The shape or the like of the processing tools 122, 132 is changed. For example, (A) the tip angle of the drill 122 is made smaller or larger so as to make the thrust force lower or larger; and (B) the rake angle of the processing tools 122, 132 is made larger or smaller so as to make the cutting resistance smaller or larger.

2. In a case where the torque is different

Method A

The rotation number (rpm) of the first machining device 120 or the second machining device 130 which has a higher torque is increased, and in the state that each of the feeds (mm/min) along the main axes in the first machining device 120 and the second machining device 130 is made the same, feed "f" per rotation (mm/rev; feed distance) is decreased.

Alternatively, the rotation number (rpm) of the machining device which has a lower torque is reduced, and in the state that each of the feeds (mm/min) along the main axes is made the same, feed "f" per rotation (mm/rev; feed distance) is increased.

Method B

The cutting allowance (mm) of the first machining device 120 or the second machining device 130 which has the higher torque is reduced, and the cutting allowance (mm) of the machining device which has the lower torque is increased.

Method C

The shape or the like of the processing tools 122, 132 is changed.

Figure 7:
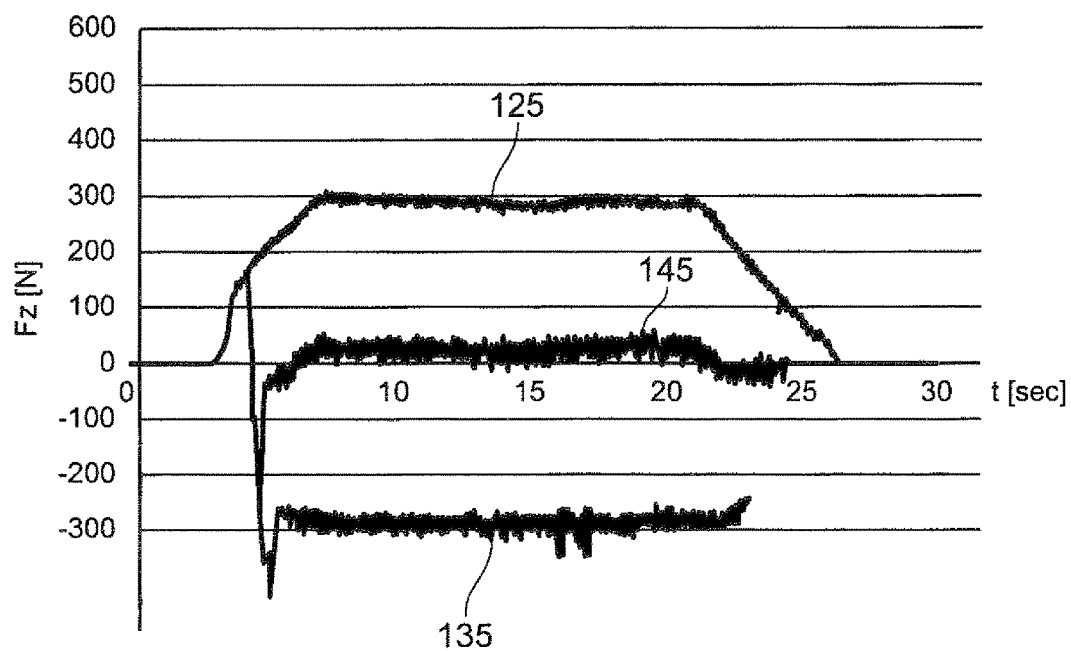
FIG. 7 is a graph showing an effect of reducing a cutting force when machining of drilling and back-boring is performed to a metal processed object by using the machining systems shown in FIGS. 1 and 2.

FIG. 7 shows one example of a measurement result of the thrust force at the arm part 111 on a leading end of the robot arm in a case where the controlling actions of the control device 140 functioning as described above are performed to the first machining device 120 and the second machining device 130. In FIG. 7, the reference symbol "125" denotes a measured value of the thrust force in the drilling of the first machining device 120, and the reference symbol "135" denotes a measured value of the thrust force in the back-boring of the second machining device 130. Thus, the resultant force 145 of the thrust forces 125, 135 is substantially zero.

Machining actions carried out by the machining system 151 of the configuration described above will be described.

The storage unit 142 in the control device 140 stores information for the first machining device 120 and the second machining device 130 in advance. This information includes, for example, data of the factors included in the calculation formulas described above, or data such as values of the thrust force and the torque in sizes of the processing tools 122, 132 for every material of the processed object 10.

The processed object 10 to which machining is performed is fixed separately from the robot 110.

Figure 8:
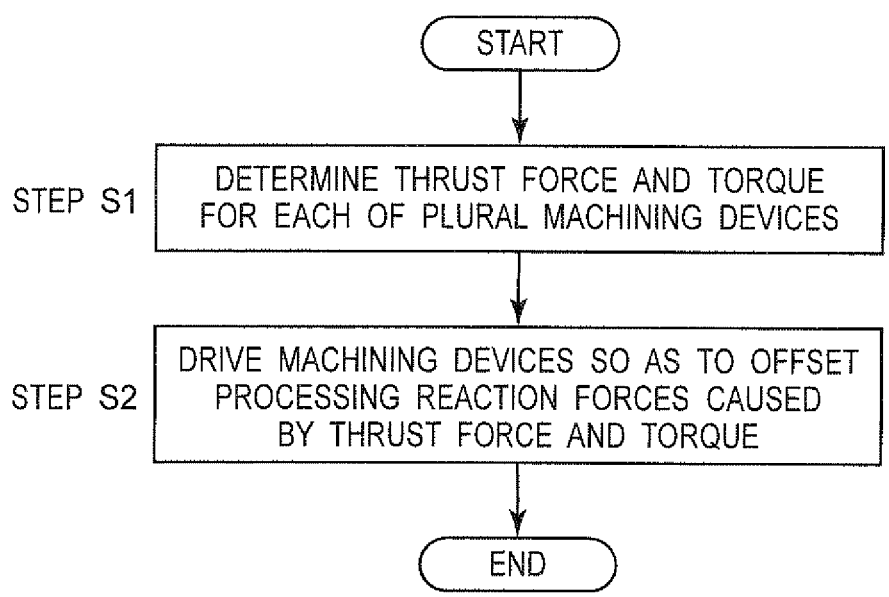
FIG. 8 is a flowchart for illustrating actions of a machining method to be executed in the machining systems shown in FIGS. 1 and 2.

In Step S1 in FIG. 8, firstly, the control device 140 extracts the thrust force and the torque regarding the first machining device 120 and the second machining device 130 mounted at the arm part 111 on the leading end of the robot arm from the storage unit 142. Alternatively, the operator can input the processing condition (the rotation number (rpm), feed speed (mm/min), or a moving amount (mm)) obtained by a test result or the like to the control device 140.

Next, in Step S2, the control device 140 sets the drive condition for the first machining device 120 and the second machining device 130 so as to offset the processing reaction forces based on the thrust force and the torque obtained by extraction or input, so that drive control is performed.

Following this drive control, the first machining device 120 and the second machining device 130 carry out the machining to the processed object 10 simultaneously.

Figure 5:
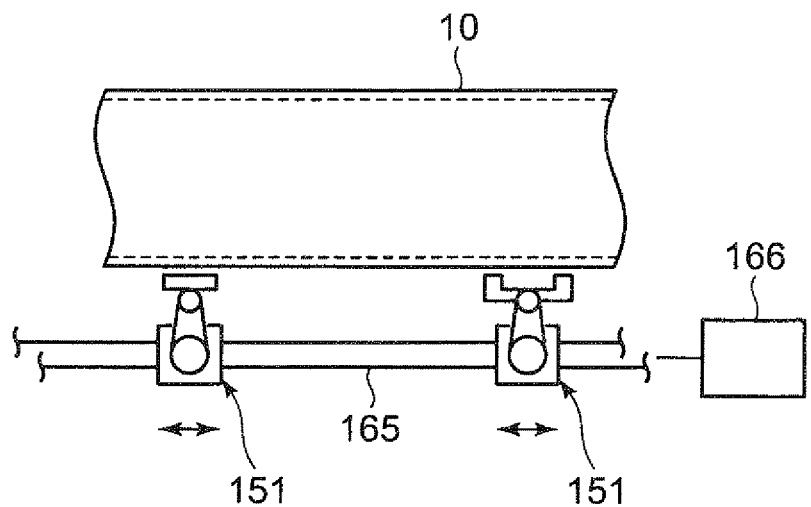
FIG. 5 is a plan view showing a schematic configuration in the modified examples of the machining systems shown in FIGS. 1 and 2.

In a machining operation, as shown in FIG. 5, for example, plural machining systems 151 can be movably installed on a moving passage 165 extending along the working direction, and the machining can be performed while moving the machining systems 151 along the moving passage 165. Movement of the machining systems 151 may be self-propelled or may be done by a moving device 166.

As described above, according to the machining system 151 of the present embodiment, in the machining by the first machining device 120 and the second machining device 130, the rotation directions of the processing tools 122, 132 with respect to the processed object 10 are opposite to each other and the moving directions of the processing tools 122, 132 are also opposite to each other, and further, the drive control is executed to the first machining device 120 and the second machining device 130. With such controlling actions, the reaction forces acting on the robot arm of the robot 110 caused by the machining actions of the first machining device 120 and the second machining device 130 can be canceled out with each other.

Therefore, the machining can be performed to, for example, the metal processed object 10 by using the robot 110 having small rigidity, and further, this machining can be carried out with high position precision and high machining quality. Thus, there is no need for a jig for compensating low rigidity in the robot, so that production efficiency can be improved and cost can be reduced as well. For example, the machining with sizes which is conventionally incapable of performing to the metal processed object 10 such as punching with sizes exceeding ϕ10 mm can be performed. Since the machining can be performed by the robot 110, freedom of a machining posture is high and an installment area is small. As a result, the processing can be performed to the large processed object 10 such as an airplane at low cost. In the present machining system 151, in order to offset the reaction forces acting onto the robot arm, there is a need for carrying out a plurality of machining actions to the processed object 10 simultaneously. Thus, the present machining system 151 is particularly effective for a processed object requiring the machining such as making a large number of holes of the same diameter, for example, for an airplane.

In the present embodiment, as described above, the case where the two machining devices 120, 130 are installed in the robot arm is adopted as an example. However, the number of the machining devices is not limited but required to be two or more. As clear from the description above, as long as the processing reaction forces caused by the thrust force and the torque of the machining devices are canceled out, the number of the plural machining devices is not limited. In the present embodiment, the machining is performed by one drill 122 and one back-boring tool 132. However, as long as the processing reaction forces are counterbalanced, the number of the processing tools in the processing type may be different.

In the present embodiment, as described above, the case where the machining devices 120, 130 respectively generate the thrust force and the torque is adopted as an example, and the control device 140 carries out the controlling actions to the first machining device 120 and the second machining device 130 so as to offset both the thrust force and the torque. However, for example, in a case where the torque is as small as non-influential in the processing, only the thrust force may be taken into consideration as an object to be offset. Thus, only the thrust force or only the torque may be canceled out. Therefore, the control device 140 may carry out the controlling actions to the first machining device 120 and the second machining device 130 so as to counterbalance at least one of the thrust force and the torque. The controlling actions may be performed to the first machining device 120 and the second machining device 130 so as to offset a combination of the thrust force and the torque such as the thrust force on one hand and the torque on the other hand. These points are also applied to the following embodiments.

Second Embodiment

In the first embodiment described above, the device provided with the back-boring tool 132 as the second machining device 130 is adopted as an example, and the configuration in which the first machining device 120 and the second machining device 130 are arranged on one side of the processed object 10 is adopted as an example.

Figure 2:
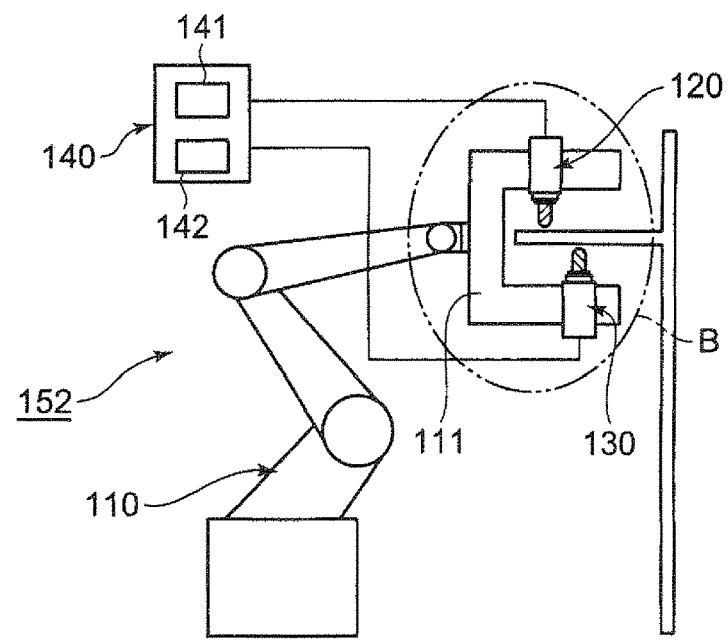
FIG. 2 is a view showing a schematic configuration of a machining system in a second embodiment.
Figure 4A:
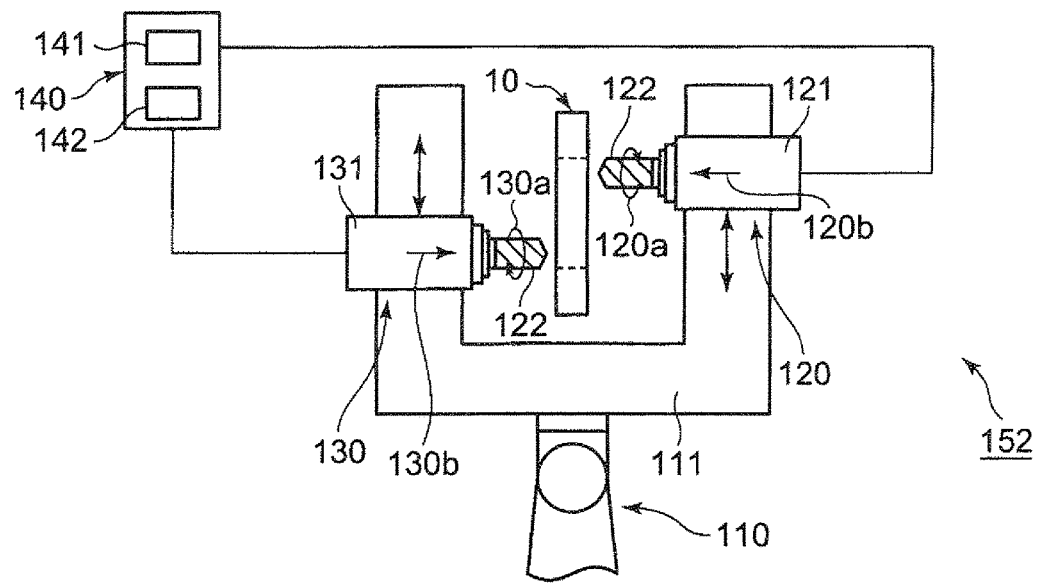
FIG. 4A is a view showing details of a part B shown in FIG. 2.

Meanwhile, in a second embodiment, as shown in FIGS. 2 and 4A, a machining system 152 has a configuration in which the first machining device 120 is arranged on one side of an processed object 10 and the second machining device 130 is arranged on the opposite side across the processed object 10, and both the machining devices 120, 130 carry out the drilling. Other configurations in the machining system 152 of the second embodiment are the same as the machining system 151 in the first embodiment described above.

In the machining system 152 of the second embodiment formed in such a way, the same effects as the machining system 151 of the first embodiment can also be obtained. That is, in the machining of the first machining device 120 and the second machining device 130, the rotation directions of processing tools 122 with respect to the processed object 10 are opposite to each other and the moving directions of the processing tools 122 are also opposite to each other, and further, drive control for the first machining device 120 and the second machining device 130 is performed by the control device 140. Thus, the reaction forces acting on the robot arm by the machining actions are offset by each other. Therefore, the machining can be performed to, for example, the metal processed object 10 by using the robot 110. For example, the machining with sizes which is conventionally incapable of carrying out to the metal processed object 10 can also be performed.

The modified example described in the first embodiment can also be applied to the machining system 152 of the second embodiment. For example, although the pair of first and second machining devices 120 and 130 is arranged on the both sides across the processed object 10 in the second embodiment, the matter disclosed in the second embodiment is not limited to this arrangement. That is, the machining devices may be arranged in a configuration other than the one to one configuration, for example, one machining device may be arranged on one side of the processed object 10 and two machining devices may be arranged on the opposite side so as to cancel out the processing reaction forces caused by the thrust force and the torque of the machining devices.

Third Embodiment

In the first and second embodiments described above, the thrust force and the torque in the first machining device 120 and the second machining device 130 are determined by at least one of the calculation formulas set in accordance with the type of the machining and the detection test to be performed in accordance with the type of the machining.

Figure 4B:
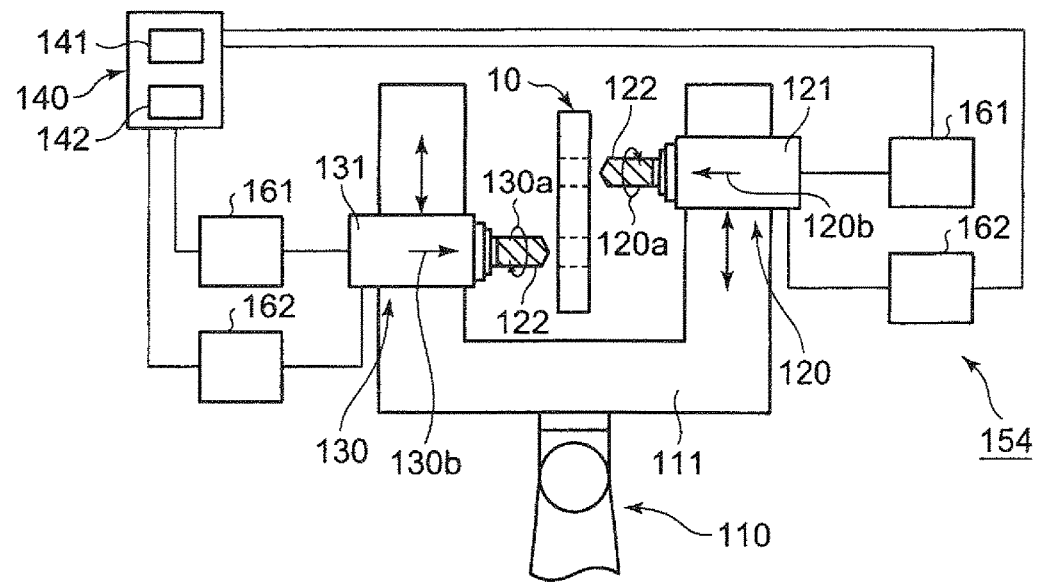
FIG. 4B is a view showing a modified example of the machining devices shown in FIG. 2.

Meanwhile, in a third embodiment, as in a machining system 153 and a machining system 154 shown in FIGS. 3B and 4B, detection devices 161 that detect the thrust force and the torque are respectively installed in the first machining device 120 and the second machining device 130. The machining system 153 shown in FIG. 3B has a configuration corresponding to the configuration of the machining system 151 shown in FIG. 1, and the machining system 154 shown in FIG. 4B has a configuration corresponding to the configuration of the machining system 152 shown in FIG. 2. The detection devices 161 may be in a form capable of detecting both the thrust force and the torque or in a form of detecting the thrust force and the torque separately. Alternatively, the detection devices may detect only one of the thrust force and the torque.

Each of the detection devices 161 is electrically connected to the control device 140.

Further, in the machining system 153 shown in FIG. 3B and the machining system 154 shown in FIG. 4B, the pitch change devices 162 for mechanically changing an arrangement pitch 112 of the first machining device 120 and the second machining device 130 can also be provided. Each of the pitch change devices 162 is electrically connected to the control device 140.

FIGS. 3B and 4B show configurations in which both the detection devices 161 and the pitch change devices 162 are provided. However, configurations in which any one of the devices are provided may be adopted.

Configurations in the machining system 153 and the machining system 154 of the third embodiment other than the detection devices 161 and the pitch change devices 162 are respectively the same as the configurations of the machining system 151 of the first embodiment and the machining system 152 of the second embodiment.

In the machining systems 153, 154 of the third embodiment formed in such a way, the same effects as the machining systems 151, 152 of the first and second embodiments can be obtained. Further, the machining systems 153, 154 have the following advantage in comparison to the machining systems 151, 152 of the first and second embodiments. That is, according to the configuration of the third embodiment, the control device 140 does not have to store the thrust force and the torque in the first machining device 120 and the second machining device 130 in advance, and the thrust force and the torque can be determined directly from measured values of the detection devices 161 or with reference to the calculation formulas described above. The drive control for the first machining device 120 and the second machining device 130 can be performed in accordance with the determined thrust force and the determined torque.

The modified examples described in the first and second embodiments can also be applied to the machining systems 153, 154 of the third embodiment.

Fourth Embodiment

In the first to third embodiments described above, replacement of the processing tools in at least one of the first machining device 120 and the second machining device 130 provided at the arm part 111 on the leading end of the robot arm is performed by the operator.

Figure 6:
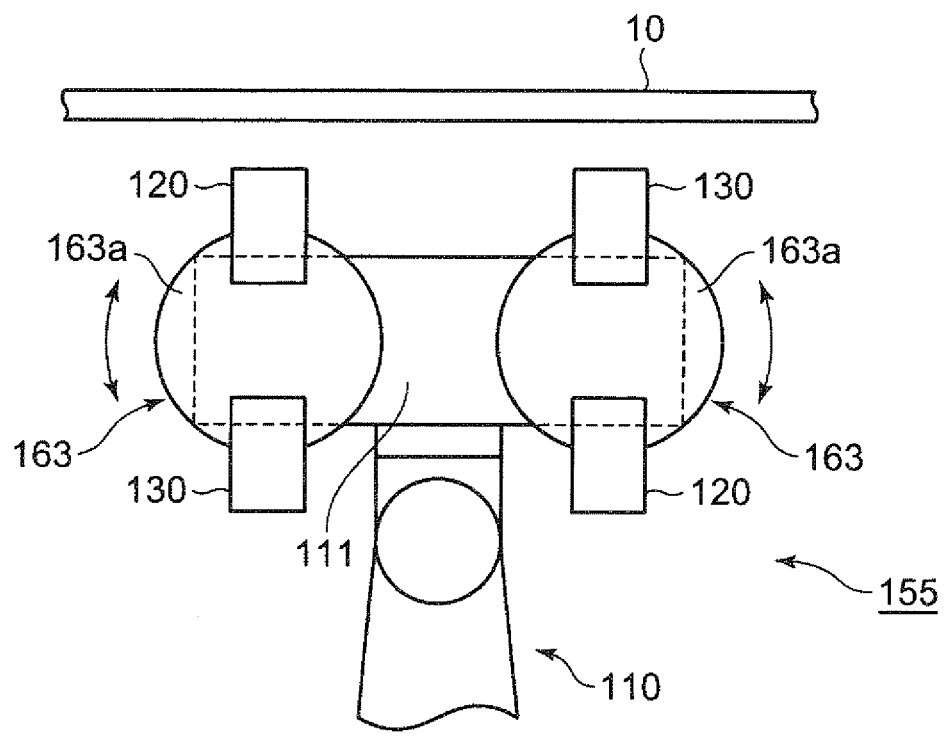
FIG. 6 is a plan view showing a schematic configuration in the modified examples of the machining systems shown in FIGS. 1 and 2.

Meanwhile, in a machining system 155 in a fourth embodiment shown in FIG. 6, the two tool replacement devices 163 having plural machining devices, the tool replacement devices that mechanically replace the machining devices, that is, replace the processing tools are provided at an arm part 111. FIG. 6 shows a configuration corresponding to the machining system 151 shown in FIG. 1. However, a configuration corresponding to the machining system 152 shown in FIG. 2 can also be adopted.

Configurations in the machining system 155 of the fourth embodiment other than the tool replacement devices 163 are respectively the same as the configurations of the machining system 151 of the first embodiment and the machining system 152 of the second embodiment. Thus, each of the machining devices 120, 130 provided in the tool replacement devices 163 are electrically connected to the control device 140, and the drive control described above is performed by the control device 140.

In the tool replacement device 163 in the fourth embodiment, the machining devices are arranged around a rotation body 163a, and by rotating the rotation body 163a in the arrow direction, replacement of the machining devices, that is, the processing tools with respect to an processed object 10 is performed.

FIG. 6 shows a configuration in which two machining devices, that is, the first machining device 120 and the second machining device 130 are provided in one tool replacement device 163. However, three or more machining devices may be provided, and the type of processing tools may be the same or different between the machining devices. In a case where the processing tools are of the same type, their sizes are different. The number of the machining devices installed may be different between the tool replacement devices 163.

In the machining system 155 of the fourth embodiment formed in such a way, the same effects as the machining systems 151, 152 of the first and second embodiments can be obtained. Further, in comparison to the machining systems 151, 152 of the first and second embodiments, replacement of the tools can be automatically performed by the tool replacement devices 163 without man power. Thus, effects of improvement in the working efficiency and reduction in the manufacturing cost can be obtained.

Fifth Embodiment

In a fifth embodiment, a case where the processed object 10 to which the first to fourth embodiments described above are applied is a fuselage of an airplane is adopted as an example, and several examples will be described.

Figure 9A:
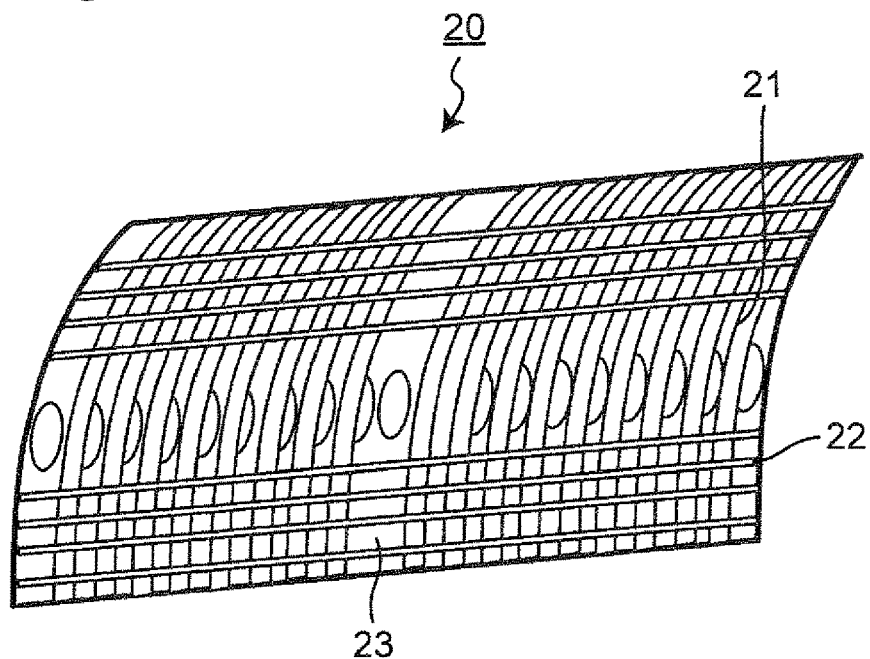
FIG. 9A is a perspective view showing a schematic of a fuselage of an airplane serving as one example of a processed object.
Figure 9B:
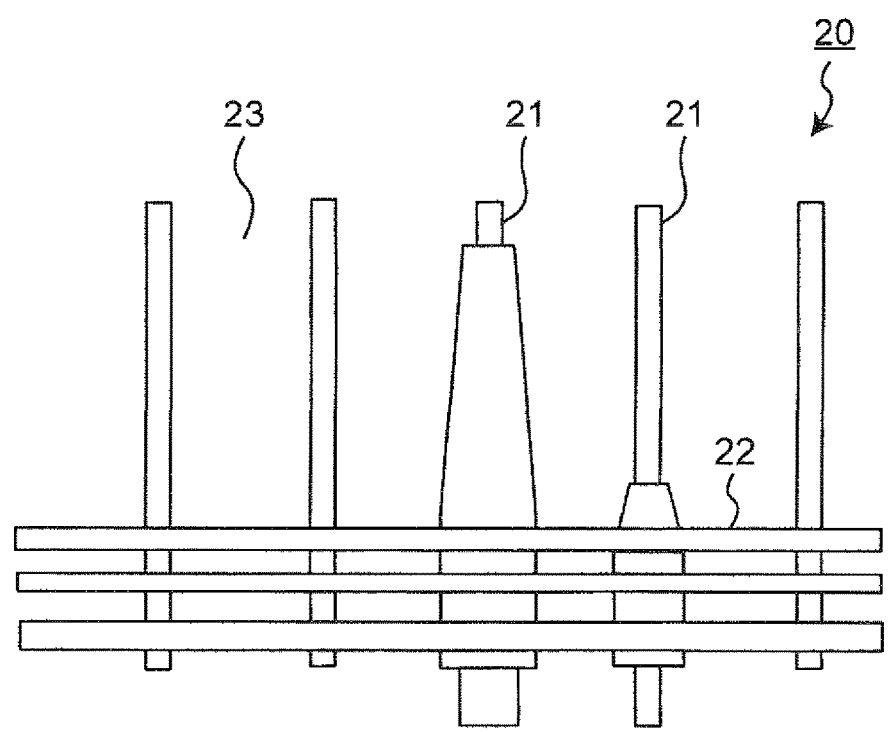
FIG. 9B is a plan view of the fuselage shown in FIG. 9A.

As shown in FIGS. 9A and 9B, a fuselage 20 of an airplane is schematically formed with members including frames 21, longerons 22, and outer skins 23. The frames 21 are members extending in the circumferential direction of the fuselage 20, the longerons 22 are members extending along the longitudinal direction of the fuselage 20 and connecting the frames 21, and the outer skins 23 are members forming an outer surface of the fuselage 20 and being fixed to the frames 21 and the longerons 22 with rivets. Thus, the frames 21, the longerons 22, and the outer skins 23 correspond to one example of the processed object 10 described above, and various machining systems 151 to 155 described in the first to fourth embodiments can be utilized.

In order to form the fuselage 20, there is a need for forming through holes for the rivets through the frames 21, the longerons 22, and the outer skins 23. The through holes are arranged vertically and horizontally in the same lines and continuously at regulated intervals. Since the holes are through holes, the processing can be performed both from the surface side and from the back side of the fuselage 20. Thus, the fuselage 20 is the processed object 10 highly suitable for utilization of the machining systems 151 to 155 described above.

Figure 10:
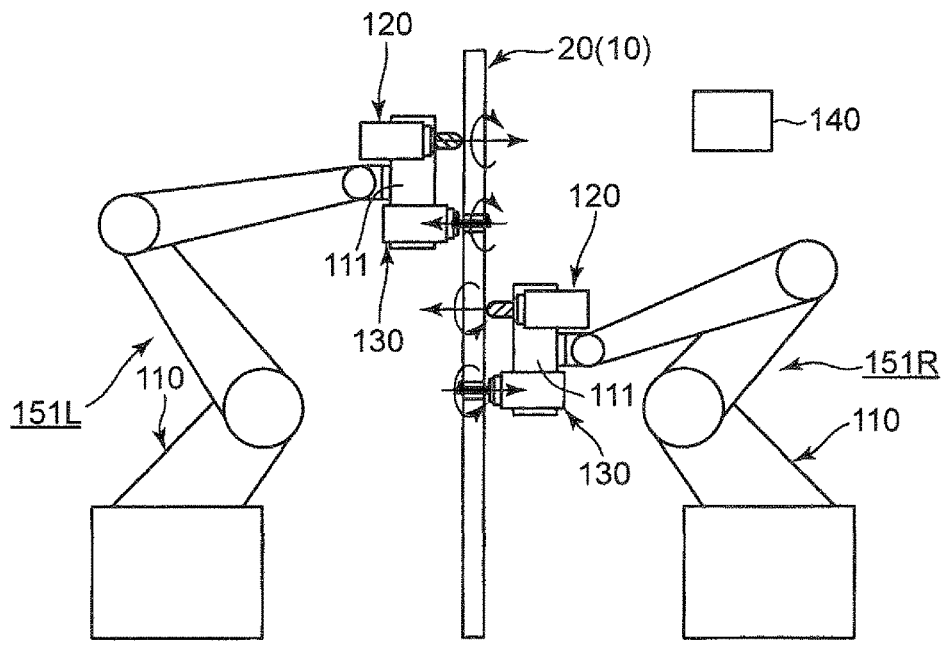
FIG. 10 is a view showing a schematic configuration of a machining system in a fifth embodiment, the view showing one of examples in which the machining system is applied to the fuselage of the airplane.

FIG. 10 shows one of application examples in which the machining system is applied to the fuselage 20 in the fifth embodiment. Specifically, two of the machining system 151 described in the first embodiment are used and robots 110 are arranged so as to sandwich the fuselage 20 from the front side and the back side as described in the second embodiment. A first machining device 120 carries out the drilling and a second machining device 130 carries out the back-boring. Although FIG. 10 shows the two robots 110, the number of the robots may be three or more. In the fifth embodiment, the machining system is not limited to the machining system 151 but the machining systems 152 to 155 may be used.

As shown in FIG. 10, the first and second machining devices 120, 130 of a machining system 151L positioned on the left side of the fuselage 20 rotate tools in the same direction, and the first and second machining devices 120, 130 of a machining system 151R positioned on the right side of the fuselage 20 also rotate tools in the same direction. However, the rotation direction of the machining system 151L on the left side and the rotation direction of the machining system 151R on the right side are different from each other.

In such a way, by refining processing positions or a processing method in the machining systems 151L, 151R on the left and right sides, moment of force acting on the fuselage 20 can be offset as described in the first to fourth embodiments.

A pitch between the adjacent through holes sometimes does not correspond to the arrangement pitch 112 between the first machining device 120 and the second machining device 130 mounted at an arm part 111 of one robot 110. In such a case, for example, when the through holes will be made at a regulated pitch in order of number 1, 2, 3, 4, 5, . . . from left to right, in accordance with the arrangement pitch 112 of the first machining device 120 and the second machining device 130, the holes of the number 1 and the number 4 are firstly made, the arm part 111 is next moved by the regulated pitch of the through holes, and the holes of the number 2 and the number 5 are then made, and so forth. Such a method can be adopted.

Figure 11:
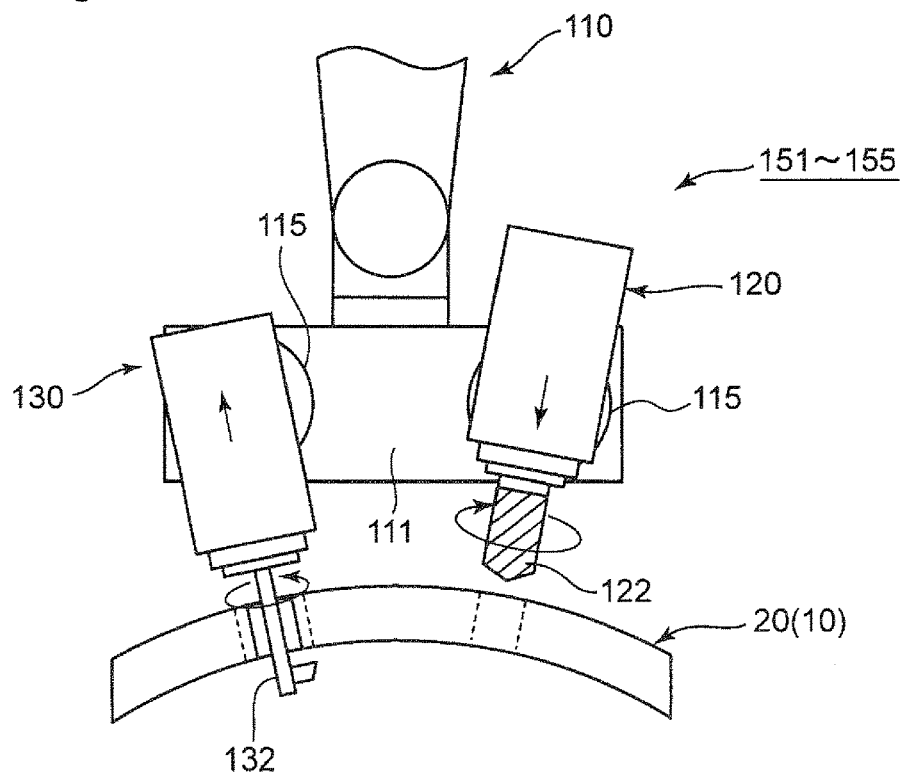
FIG. 11 is a view showing a modified example of the machining system in the fifth embodiment.

In a case where the processed object 10 is the fuselage 20 of the airplane, a configuration as shown in FIG. 11 can also be adopted as a modified example of the fifth embodiment.

That is, the fuselage 20 has a cylindrical shape and the diameter of, for example, about 6 m. Meanwhile, with respect to a surface of the fuselage 20 having a curvature as above, there is a need for arranging the main axes of the processing tools of the first machining device 120 and the second machining device 130 as perpendicularly as possible.

Therefore, as shown in FIG. 11, inclination mechanisms 115 with which the first machining device 120 and the second machining device 130 can be installed at regulated angles with respect to the arm part 111 of the robot 110 may be provided.

With respect to the fuselage 20 having the diameter described above, a pitch between the through holes is only about 5 cm. Even in a case where the arrangement pitch 112 of the first machining device 120 and the second machining device 130 is several times more than the pitch of the through holes, inclination angles of the first machining device 120 and the second machining device 130 are hardly distinctive from a case of an processed object 10 having no curvature. Thus, the action of "offsetting the processing reaction forces" described in the first to fourth embodiments can be applied.

Figure 12A:
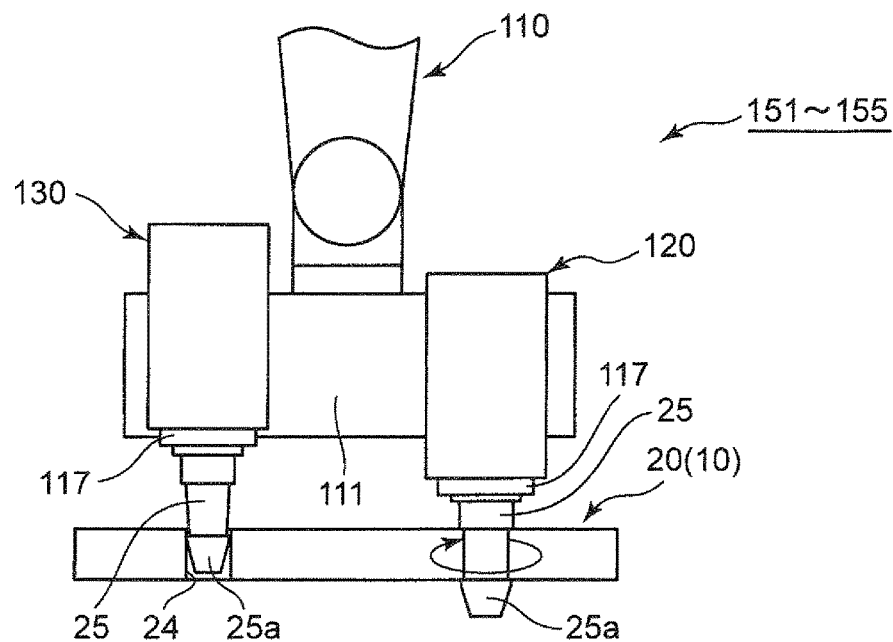
FIG. 12A is a view showing a further modified example of the machining system in the fifth embodiment.
Figure 12B:
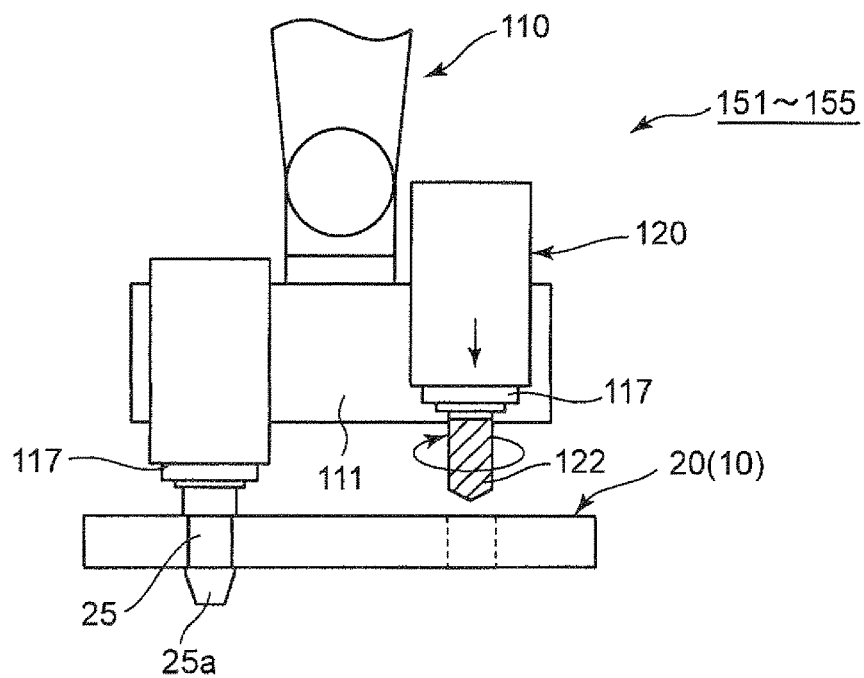
FIG. 12B is a view showing a further modified example of the machining system in the fifth embodiment.

Further, in the case where the processed object 10 is the fuselage 20 of the airplane, configurations as shown in FIGS. 12A and 12B (sometimes collectively referred to as FIG. 12) can also be adopted as further modified examples of the fifth embodiment. In those configurations, a major viewpoint is that utilizing the arrangement of the first machining device 120 and the second machining device 130 installed at the arm part 111 of the robot 110, and a viewpoint of utilizing cancellation of the processing reaction forces is minor.

When the outer skins 23 are fastened to through holes 24 opened in the fuselage 20 by the rivets, temporary fasteners 25 are sometimes used. The temporary fasteners 25 are components for temporarily fastening members, for example, the temporary fasteners 25 is used for temporarily fastening the plural frames 21 and the longerons 22, and the outer skin 23, or for temporarily fastening a set of plural outer skins 23 to the frame 21 or the like. As shown in FIG. 12A, the temporary fasteners 25 are components to be inserted into the through holes 24, the components to be fixed to and unfixed from the through holes 24 by expanding and reducing diameters of displacement portions 25a of the temporary fasteners 25. The expansion and reduction of the displacement portion 25a are caused by rotating the fastener.

Meanwhile, in order to replace the processing tools, the first machining device 120 and the second machining device 130 have tool attachment portions 117 as shown in FIG. 12. Thus, the fastener tools can be attached to the tool attachment portions 117. Alternatively, the fastener tools may be attached to the arm part 111 of the robot 110 instead of the first machining device 120 and the second machining device 130. In any configurations, the temporary fasteners 25 are rotated and fixed by the first machining device 120 and the like, so that the frames 21 and the longerons 22 and the outer skins 23 are temporarily fastened. Further, after temporary fastening is finished, the temporary fasteners 25 are rotated again, unfixed, and removed from the through holes 24.

In the configuration in which the temporary fasteners 25 are used, further, by utilizing the arrangement of the first machining device 120 and the second machining device 130 installed in the arm part 111 of the robot 110, a configuration shown in FIG. 12B can also be adopted.

That is, the temporary fastener 25 is attached to the second machining device 130 on one side installed in the arm part 111 of the robot 110, and the drill serving as the processing tool 122 is attached to the first machining device 120 on the other side. Firstly, the temporary fastener 25 is inserted into the through hole 24 and rotated by the second machining device 130, so that the outer skin 23 and the frame 21 and the like are fixed. While the temporary fastener 25 fixed to the through hole 24 is coupled to the second machining device 130, the drilling is performed to the fuselage 20 by the first machining device 120.

In such a way, after fixing the temporary fastener 25, since the second machining device 130 keeps holding the fixed temporary fastener 25, when the machining is performed by the first machining device 120 in the robot arm having low rigidity, displacement of the robot 110 can be suppressed or further prevented. As a result, the position precision and further processing precision at other machining points can be improved. In such a way, the temporary fastener 25 held by the second machining device 130 can be a reference point for other machining points.

In such a way, by utilizing the robot 110 in the first to fourth embodiments, the temporary fastener 25 can also be used.

A configuration formed by combining the embodiments described above can also be adopted. The constituent parts shown in different embodiments can also be combined with each other.

By appropriately combining arbitrary embodiments among various embodiments described above, the effects of the respective embodiments can be exerted.

The present invention is sufficiently described relating to the preferred embodiments with reference to the attached drawings. However, for those skilled in the art, various modifications and corrections are obvious. Such modifications and corrections should be understood as included in the present invention unless otherwise departing from the scope of the present invention described in the attached claims.

All the disclosed contents of the description, the drawings, the claims, and the abstract of Japanese Patent Application No. 2014-265698 filed in Dec. 26, 2014 are taken herein as a reference.

INDUSTRIAL APPLICABILITY

The present invention can be applied to a machining method applicable when machining is performed to a processed object, and a machining system.

DESCRIPTION OF REFERENCE SYMBOLS

10 PROCESSED OBJECT
110 ROBOT
120 FIRST MACHINING DEVICE
122 PROCESSING TOOL
130 SECOND MACHINING DEVICE
132 PROCESSING TOOL
140 CONTROL DEVICE
141 CONDITION SETTING UNIT
151 to 155 MACHINING SYSTEM
161 DETECTION DEVICE
162 PITCH CHANGE DEVICE
163 TOOL REPLACEMENT DEVICE

The invention claimed is:

1. A machining method performing machining to a processed object made of metal by using various machining devices installed at plural points in a processing mechanism, comprising:
    determining at least one of a thrust force and a torque for each of the machining devices, the thrust force and the torque being obtained when each machining device carries out the machining to the processed object; and
    controlling drive of the machining devices by a control device so as to offset processing reaction forces caused by at least one of the thrust force and the torque to be obtained when the machining devices carry out the machining to the processed object simultaneously.

2. The machining method according to claim 1, wherein the processing mechanism is a robot, and
    the machining devices are installed at plural points in a robot arm of the robot.

3. The machining method according to claim 1, wherein the thrust force and the torque are determined by using at least one of a calculation formula set in accordance with the type of the machining and a detection test to be performed in accordance with the type of the machining, and
    the controlling drive by the control device is performed by setting a drive condition, for each of the machining devices, making at least one of the thrust force and the torque be substantially equal between the machining devices.

4. The machining method according to claim 1, wherein the thrust force and the torque are determined from a measured value of a detection device connected to each of the machining devices, and
    the controlling drive by the control device is performed by setting a drive condition, for each of the machining devices, making at least one of the thrust force and the torque be substantially equal between the machining devices.

5. The machining method according to claim 1, wherein the controlling drive of the machining devices whose processing reaction forces are to be offset is performed by increasing or decreasing a feed distance per one rotation of each of processing tools in the machining devices with a feed per unit time of each of the processing tools being set the same between the machining devices when the thrust force or the torque is different between the machining devices.

6. The machining method according to claim 1, wherein the controlling drive of the machining devices whose processing reaction forces are to be offset is performed by reversing a direction of action in at least one of the thrust force and the torque acting on the processed object between the machining devices.

7. The machining method according to claim 1, wherein the machining is drilling, back-boring, or boring.

8. A machining system having plural machining devices installed at plural points in a processing mechanism, the machining system carrying out machining to a processed object made of metal by using the machining devices, the machining system comprising:
a control device configured to control drive of the machining devices so as to offset processing reaction forces caused by at least one of a thrust force and a torque to be obtained when the machining devices carry out the machining to the processed object simultaneously between the machining devices.

9. The machining system according to claim 8, wherein the processing mechanism is a robot, and
the machining devices are installed at plural points in a robot arm of the robot.

10. The machining system according to claim 8, wherein the control device has a condition setting unit configured to set a drive condition making the processing reaction forces offset in accordance with at least one of the thrust force and the torque, the at least one of the thrust force and the torque being determined by at least one of a calculation formula and a detection test, the calculation formula being set in accordance with the type of the machining and the detection test being performed in accordance with the type of the machining.

11. The machining system according to claim 8, further comprising:
a detection device connected to each of the machining devices, the detection device configured to detect the thrust force and the torque in machining action, wherein
the control device has a condition setting unit configured to set a drive condition making the processing reaction forces offset in accordance with at least one of the thrust force and the torque obtained from the detection device.

12. The machining system according to claim 8, wherein the machining is drilling, back-boring, or boring.

13. The machining system according to claim 8, wherein the machining device has a tool attachment portion to which a tool carrying out the machining is attached, and
the tool attachment portion is installed with a temporary fastener temporarily fastening the processed object.

* * * * *